United States Patent Office 3,201,436
Patented Aug. 17, 1965

3,201,436
HALOGENATED DERIVATIVES OF DIALKYL CYCLODODECADIENEPHOSPHONATES
Maximilian I. Fremery and Ellis K. Fields, Chicago, Ill., assignors to Standard Oil Company, Chicago, Ill., a corporation of Indiana
No Drawing. Filed May 31, 1962, Ser. No. 198,727
3 Claims. (Cl. 260—461)

This invention relates to new organic-phosphorous compounds. More particularly, it relates to novel derivatives of cyclododecatriene and diesters of phosphorous acid, to their preparation and use as additives for lubricants.

The new compounds of this invention are cyclododecadiene phosphonic acid, esters and alkali metal salts thereof. These compounds are represented by the formula Z—P(O)(OR)$_2$ wherein Z is a cyclododecadienyl radical, and R represents hydrogen, a hydrocarbyl radical or an alkali metal.

1,5,9-cyclododecatriene is an unique cyclic olefin. It is well known in the art, being prepared by trimerizing butadiene with alkyl metal-type catalysts, its preparation and description being described in U.S. 2,964,574. The reaction product obtained by the trimerization of butadiene comprises an isomeric mixture of cis, trans, trans, and trans,trans,trans, isomers.

It has been discovered that cyclododecatriene reacts with a diester of phosphorous acid in an unexpected manner. The reaction of an olefin and an organic phosphite (diester of phosphorous acid) in the presence of a free radical initiator is well known in the art. In such reactions there is an addition of a mole of phosphite per double bond present in the olefin. Since cyclododecatriene is a triolefin, one would expect the addition of three moles of phosphite to each mole of cyclododecatriene. However, it has been found, in accordance with this invention, that in the presence of a free radical initiator only one of the three double bonds of cyclododecatriene reacts with an organic phosphite to produce a mono-substituted cyclododecatriene in substantially equimolar quantities. Thus, the reaction product of the free radical reaction of cyclododecatriene and an organic phosphite is a substantially pure cyclododecadienephosphonate.

The cyclododecadienephosphonates of this invention are prepared by causing a diester of phosphorous acid to react with cyclododecatriene by subjecting a reaction mixture comprising said diester of phosphorous acid and said cyclododecatriene to the action of a free radical reaction initiator at a temperature within the range of about 70° to about 170° C., preferably 100 to 150° C., for a period of time sufficient to complete the formation of 1:1 adduct of cyclododecatriene and the phosphorous acid diester. The molar ratio of the reactants is from about 1:1 to about 2:1 moles of diester of phosphorous acid to cyclododecatriene. The preferred ratio is 1:1. The reaction time, being dependent upon the reaction temperature, is not critical; and is usually within the range of from about 4 to about 60 hours, preferably 12 to 24 hours.

The diester of phosphorous acid reactant is represented by the formula H—P(O)(OR)$_2$ wherein R can be any hydrocarbon radical, such as branch-chain or straight-chain alkyl, cycloalkyl, aryl, alkaryl and aralkyl radicals. The dialkyl and dicycloalky phosphites containing from 1 to about 30 carbon atoms are the preferred diesters of phosphorous acid reactant. The radical R can contain substituent groups therein, such as thio groups, hydroxyl groups, halogen atoms, carboxyl radicals, nitro groups, etc. The radical R of the diester can be the same or different hydrocarbyl radical.

Suitable reaction initiators for the present process comprise compounds which at temperatures between about 70° and 170° C. will readily dissociate into free radicals under the influence of actinic light, or which readily dissociate under the influence of a temperature within the above range, even in the absence of actinic light. The property of dissociating into free radicals under the conditions defined is a property of a particular compound, the existence or non-existence of which is determinable by those skilled in the art. Preferred free radical formers for use in this invention are the organic peroxides, such as ditertiarybutyl peroxide, tertiary-butylhydroperoxide, tertiarybutylperbenzoate and benzoyl peroxide. The amount of reaction initiator employed may vary over wide limits depending upon the character of the particular initiator. In general, from about 0.01 mole to about 5 moles of reaction initiator based on the phosphorous compound is suitable.

The preparation of the novel compounds of this invention and their use is illustrated in the following examples.

EXAMPLE 1

To a three-neck flask provided with stirrer, thermometer and reflux condenser was added 100 g. (1.1 moles equivalents) of an isomeric mixture of 1,5,9-cyclododecatriene, having a boiling point of 92° C. at 12 mm. pressure, 79 g. of diethyl phosphite (1 mole equivalent) and 0.01 mole of tertiarybutyl peroxide. The reaction mixture was heated at 130° C. under a nitrogen blanket for 24 hours with incremental addition each second hour of the reaction of 0.01 mole of tertiarybutyl peroxide. The unreacted diethyl phosphite and cyclododecatriene were removed by distillation leaving a dark viscous oil residue found to be diethyl cyclododecadiene phosphonate—yield, 89 mole percent.

A portion of the residue was distilled at $10^{-3}$ mm. The fraction having the boiling point of 165° C. at $10^{-3}$ mm. was hydrolyzed with concentrated aqueous hydrochloric acid for 8 to 12 hours under reflux conditions. The reaction mixture was then washed with water to a pH of about 5 and then dried under sub-atmospheric pressure.

The balance of the residue was refluxed with concentrated aqueous hydrochloric acid for 8 to 12 hours. The reaction mixture was admixed with a slight excess (volume) of 20% aqueous sodium hydroxide, whereby the water-soluble disodium salt of cyclododecadienephosphonic acid was obtained. The reaction mixture was extracted with benzene to remove any residual organic reactants. The clear aqueous alkaline portion was slowly acidified with 20% hydrochloric acid to form the mono-sodium salt of cyclododecadienephosphonic acid, which quantitatively precipitated as formed. The salt was isolated by filtration, washed with methanol and acid hydrolyzed to obtain the pure free cyclododecadienephosphonic acid, which is a very viscous light-yellow colored oil after vacuum drying. The products obtained by the above hydrolysis treatment of the phosphonate were combined, giving a yield of 65 mole percent. Cyclododecadienephosphonic acid was identified by the following analysis:

|   | Calculated for $C_{12}H_{21}PO_3$ | Found |
|---|---|---|
|   | Percent | Percent |
| C | 59.34 | 58.53 |
| H | 8.69 | 8.89 |
| P | 12.6 | 11.8 |

The cyclododecadiene derivatives of this invention, as additives for lubricating oil to impart extreme pressure properties as well as anti-rust properties to such lubricants, are particularly suitable for use in amounts of from about 0.001% to about 10%. The metal salts have been found to be effective detergents.

Suitable lubricating base oils are hydrocarbon oils, e.g., petroleum oils, synthetic hydrocarbon lubricating oils such as those obtained by the polymerization of hydrocarbons, and other synthetic lubricating oils such as alkylene oxide type oils, for example, the "Ucon Oils" marketed by Carbide and Carbon Corporation, polycarboxylic acid ester-type oils such as esters of adipic acid, sebacic acid, azelaic acid, etc. and other synthetic lubricating oils.

The anti-rust properties of a solvent extracted SAE 30 lubricating oil containing cyclododecadienephosphonic acid as the sole additive was determined in accordance with the American Society for Testing and Materials Method D-665. This method indicates the ability of oils with or without anti-rust additives to prevent the rusting of ferrous parts should water become mixed with the oil. Samples of the aforesaid SAE 30 oil containing 0.01, 0.05, 0.1 and 1 percent by weight of cyclododecadienephosphonic acid all passed the D-665 rust test. That is, the test specimens were rust-free at the end of the test period. An oil sample containing 0.001% gave a light rusting rate.

The novel compounds of this invention are also valuable starting materials for organic syntheses. Thus, the cyclododecadienephosphonic acid, esters and salts, or the phosphonates can be hydrogenated in a known manner to the corresponding cyclododecene or cyclododecane derivatives; or the cyclododecadienephosphonic acid esters and salts can be converted into epoxy-containing compounds. Another class of useful derivatives of the compounds of this invention are the chlorine and bromine derivatives wherein chlorine or bromine is introduced into the cyclododecadienyl radical or the addition of halogen-containing substituents to the olefinic bonds.

EXAMPLE 2

A solution of 6 g. (0.02 mole) cyclododecadienephosphonic acid diethyl ester and 0.1 g. benzoyl peroxide in 10 ml. (0.105 mole) bromotrichloromethane was refluxed 2 hours, then evaporated in vacuo, leaving 6.7 g. red viscous product that analyzed 8.0% P and 14.2% halogen as chloride.

EXAMPLE 3

A mixture of 6 g. (0.02 mole) cyclododecadienephosphonic acid diethyl ester and 16.2 ml. (0.1 mole) hexachlorocyclopentadiene was heated at 120° C. for 64 hours. The excess hexachlorocyclopentadiene was distilled in vacuo, the residue was taken up in 120 ml. hexane, filtered, and evaporated, leaving 6.4 g. red, viscous liquid that analyzed 7.5% P and 22.3% Cl.

EXAMPLE 4

A solution of 4 g. (0.0133 mole) cyclododecadienephosphonic acid diethyl ester in 50 ml. methylene chloride was treated with a solution of bromine in methylene chloride till no more bromine was taken up at 30° C., then evaporated on the steam bath, leaving 5.1 g. red, very viscous liquid that analyzed 8.2% P and 28.8% Br.

Lubricating oils containing diethyl cyclododecadienephosphonates and the reaction products of Examples 2, 3 and 4 exhibit excellent extreme pressure properties, as illustrated by the data in Table I. The Almen values were determined on the Almen Tester in the manner described in the Proceedings of the 15th Annual Meeting American Petroleum Institute, 15, Sect. III, 60 (1934), or the Oil and Gas Journal 33, No. 26, 123, 126 (1934).

Table I

| Additive | Conc., wt. percent | Almen Test | |
|---|---|---|---|
| | | Pass, lb. | Fail, lb. |
| Control, None | 0.0 | 4 | 6 |
| Diethyl Cyclododecadienephosphonate | 0.1 | 14 | 16 |
| Product, Example 2 | 0.1 | 30+ | |
| | 0.05 | 18 | 20 |
| | 0.01 | 6 | 8 |
| Product, Example 3 | 0.1 | 30+ | |
| | 0.05 | 30+ | |
| | 0.01 | 6 | 8 |
| Product, Example 4 | 0.1 | 30+ | |
| | 0.05 | 30+ | |
| | 0.01 | 6 | 8 |

The data in Table I show that diethyl cyclododecadienephosphonate imparts extreme pressure properties to lubricating oils, and that these properties are greatly enhanced by incorporating halogen-containing substituents in the cyclododecadienyl radical.

While this invention has been described in connection with the use of the herein described additives and lubricant compositions, their use is not limited thereto but the same can be used in products other than lubricating oils, such as for example, fuel oils, insulating oils, greases, non-drying animal and vegetable oils, waxes and asphalts.

Concentrates of a suitable oil base containing more than 10% e.g., from about 15% to about 50% or more, of the herein described derivatives, alone, or in combination with more than 10% of other additives, can be used for blending with other oils in proportions desired for the particular condition or use to give a finished product containing from about 0.001 to about 10% of the described derivative.

Lubricant composition containing the herein described derivatives can contain other addition agents such as for example, antioxidants, pour point depressors, V.I. improvers, etc.

Unless otherwise stated, percentages given herein and in the appended claims are weight percentages.

Lubricant compositions containing the herein described cyclododecadienephosphonate derivatives are being claimed in our copending divisional application Serial No. 360,795, filed March 27, 1964.

Thus, having described the invention, what is claimed is:

1. The reaction product obtained by refluxing one mole of diethyl cyclododecadienephosphonate with about 5 moles of bromotrichloromethane in the presence of benzoyl peroxide.

2. The reaction product obtained by initially admixing one mole of diethyl cyclododecadienephosphonate with about 5 moles of hexachlorocyclopentadiene and heating at about 120° C.

3. The reaction product obtained by treating diethyl cyclododecadienephosphonate in methylene chloride with a solution of bromine in methylene chloride until no more bromine is taken up at 30° C.

References Cited by the Examiner

UNITED STATES PATENTS

| | | | |
|---|---|---|---|
| 2,174,019 | 9/39 | Sullivan | 252—49.8 |
| 2,274,291 | 2/42 | Clayton et al. | 252—49.8 |
| 2,550,651 | 4/51 | Dickey et al. | 260—461 |
| 2,671,106 | 3/54 | Albisetti et al. | 260—461 |
| 2,806,049 | 9/57 | Raab et al. | 260—461 |
| 2,957,931 | 10/60 | Hamilton et al. | 260—461 X |

CHARLES B. PARKER, *Primary Examiner.*

DANIEL E. WYMAN, *Examiner.*